(12) United States Patent
Aldridge et al.

(10) Patent No.: US 7,457,543 B2
(45) Date of Patent: Nov. 25, 2008

(54) ADD/DROP MODULE FOR SINGLE FIBER WAVELENGTH DIVISION MULTIPLEXING SYSTEMS

(75) Inventors: James Finn Aldridge, Palo Alto, CA (US); Frank Levinson, Palo Alto, CA (US); Johnny Zhong, Hayward, CA (US); Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 460 days.

(21) Appl. No.: 10/910,184

(22) Filed: Aug. 2, 2004

(65) Prior Publication Data
US 2005/0025489 A1    Feb. 3, 2005

Related U.S. Application Data

(60) Provisional application No. 60/498,949, filed on Aug. 29, 2003, provisional application No. 60/492,181, filed on Aug. 1, 2003.

(51) Int. Cl.
*H04J 14/02* (2006.01)
*H04B 10/00* (2006.01)

(52) U.S. Cl. .............................. 398/83; 398/5
(58) Field of Classification Search ................ 398/3–5, 398/59, 83–85
See application file for complete search history.

(56) References Cited

U.S. PATENT DOCUMENTS

| | | | |
|---|---|---|---|
| 5,307,353 A * | 4/1994 | Yamashita et al. ............. | 714/4 |
| 5,396,357 A * | 3/1995 | Goossen et al. ............... | 398/59 |
| 6,847,787 B2 * | 1/2005 | Halgren et al. ................ | 398/83 |
| 7,110,668 B2 * | 9/2006 | Gerstel et al. .................. | 398/5 |
| 2005/0084262 A1 * | 4/2005 | Oberg et al. .................. | 398/19 |

OTHER PUBLICATIONS

U.S. Appl. No. 10/889,333, filed Jul. 12, 2004, Steve Wang et al.
U.S. Appl. No. 10/910,424, filed Aug. 2, 2004, Johnny Zhong et al.
U.S. Appl. No. 10/802,434, filed Mar. 17, 2004, James Finn Aldridge.
Aldridge, J., The Best of Both Worlds, [online] Sep. 2002 [retrieved on Oct. 23, 2002]. Retrieved from the Internet: URL: http://lwe.pennnet.com/Articles/Article_Display.cfm?Section=Articles&Subsection=Display&Article_ID=155526.
Bell, Robert, World Teleport Association, Intelligent Cities and Tech-Space: What Lies Ahead, [online] Feb. 2002 [retrieved on Nov. 7, 2002]. Retrieved from the Internet: URL: http://www.facilitycity.com/busfac/bf_02_02_intel.asp.

(Continued)

*Primary Examiner*—Christina Y Leung
(74) *Attorney, Agent, or Firm*—Workman Nydegger

(57) ABSTRACT

Systems and methods use single-fiber optical add/drop multiplexers (OADMs) to enable bi-directional data transmission in WDM systems over a single fiber. By reducing the required capacity for an optical network from dual fibers to a single fiber, significant cost and bandwidth efficiencies are achieved. The systems and methods also provide redundancy protection in single-fiber bidirectional line ring systems. In the event of a downstream fiber or device failure, the OADM module receives a signal on a first wavelength from a first direction, shifts the signal from the first wavelength to a second wavelength, and sends the signal back down the fiber it originated from on the second wavelength, thus maintaining the propagation of the signal in the ring system.

12 Claims, 9 Drawing Sheets

OTHER PUBLICATIONS

*Standard Classic BIDI Classic Bi-Directional Optical Component*, Infineon Technologies, Feb. 2003, *available at* http://www.infineon.com/cmc_upload/documents/021/136/BIDIProductBrief-March2003.pdf.

*Triport-BIDI Classic Bi-Directional Optical Component with a Second Receiver for Analog Video*, Infineon Technologies, Feb. 2003, *available at* http://www.infineon.com/cmc_upload/documents/039/198/Triport-BIDIProductBrief-March2003.pdf.

*BIDI-TRX Bi-Directional Transceivers for Full-Duplex Two-Way Communication Over a Single Fiber*, Infineon Technologies, Feb. 2003, *available at* http://www.infineon.com/cmc_upload/documents/039/179/BIDI-TRXProductBrief-March2003.pdf.

* cited by examiner

ADD/DROP MODULE FOR SINGLE FIBER WAVELENGTH DIVISION MULTIPLEXING SYSTEMS

CROSS-REFERENCE TO RELATED APPLICATIONS

This application claims the benefit of: U.S. Provisional Application No. 60/498,949, filed Aug. 29, 2003, and U.S. Provisional Application No. 60/492,181, filed Aug. 1, 2003, both of which are hereby incorporated herein by reference in their entirety.

BACKGROUND OF THE INVENTION

1. The Field of the Invention

The present invention relates generally to the field of high speed optical communications systems. More particularly, embodiments of the invention relate to devices, systems, and methods for providing bi-directional multiplexed traffic on single optical fibers.

2. The Relevant Technology

Computer and data communications networks continue to develop and expand due to declining costs, improved performance of computer and networking equipment, the remarkable growth of the internet, and the resulting increased demand for communication bandwidth. Such increased demand is occurring both within and between metropolitan areas as well as within communications networks, such as wide area networks ("WANs"), metropolitan area networks ("WANs"), and local area networks ("LANs"). These networks allow increased productivity and utilization of distributed computers or stations through the sharing of resources, the transfer of voice and data, and the processing of voice, data, and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electromagnetic radiation that interferes with electrical signals; fiber optic cables' ability to prevent light signals from escaping, as can occur electrical signals in wire-based systems; and light signals' ability to be transmitted over great distances without the signal loss typically associated with electrical signals on copper wire.

Another advantage in using light as a transmission medium is that multiple wavelength components of light can be transmitted through a single communication path such as an optical fiber. This process is commonly referred to as wavelength division multiplexing (WDM), where the bandwidth of the communication medium is increased by the number of independent wavelength channels used. To accomplish wavelength division multiplexing, several specialized optical components are used, including demultiplexers (demuxes), multiplexers (muxes), mux/demux modules, and optical add/drop multiplexers (OADMs).

A demultiplexer generally takes as its input an optical transmission that includes a number of individual signals, with each signal being transmitted using a particular wavelength of light. An exemplary optical demultiplexer is shown in FIG. 1 and designated generally as 10. The optical demultiplexer 10 has an input port 12. The input port 12 receives a multiplexed transmission 14. In the present example, the multiplexed transmission 14 has four individual signals, each of different wavelengths, which are designated in this example as $\lambda 1$, $\lambda 2$, $\lambda 3$, and $\lambda 4$, as indicated in FIG. 1A. The optical demultiplexer 10 is a passive device, meaning that no external power or control is needed to operate the device. Although, in this example, the optical demultiplexer 10 is a passive device, it should be noted that active devices can be used in optical demultiplexing as well. Using a combination of passive components, such as thin-film three-port devices, mirrors, birefringent crystals, etc., the optical demultiplexer 10 separates the multiplexed signal 14 into its constituent parts. Each of the individual wavelengths, each representing a separate signal on a communication channel, is then output to one of output ports 16a-16d.

A multiplexer functions in the inverse manner as the demultiplexer. Multiplexers can often be constructed from demultiplexers simply by using the output ports 16 as input ports and the input port 12 as an output port.

An optical device that combines the functionality of a demultiplexer and a multiplexer is known as a mux/demux. An exemplary mux/demux is shown in FIG. 2 and designated generally as 20. The mux/demux 20 has a multiplexed input port 22 that accepts as its input a multiplexed transmission 14. The multiplexed transmission 14 is separated into its constituent parts and output to demultiplexed output ports 24. In a multiplexing operation, demultiplexed input ports 26 accept as their input individual signals, with each signal being encoded on a different optical wavelength. The individual signals are combined into a multiplexed transmission 15 and output to the multiplexed output 28.

An OADM is a component designed to extract an individual signal from a multiplexed transmission while allowing the remaining signals on the multiplexed transmission to pass through. The OADM also has an add port that can be used to remix the extracted signal with the multiplexed transmission or to transmit other data onto the fiber-optic network. An example of an OADM is shown in FIG. 3 and designated generally as 30. The OADM 30 is designed for bi-directional data communication. In optical networks, to distinguish the direction of data travel, the directions are referred to as east and west directions. In FIG. 3, data that travels in an easterly direction travels to the right of the OADM 30. Data the travels in a westerly direction travels to the left of the OADM 30.

Illustrating the functionality of the OADM 30, a multiplexed transmission 14 is input into the west input port 32. The OADM 30 is designed for a specific wavelength or, more precisely, a band of wavelengths. For example, if the particular multiplexed transmission has optical signals over four wavelength channels, including a 1510 nanometer wavelength, a 1530 nanometer wavelength, a 1550 manometer wavelength, and a 1570 nanometer wavelength, and the OADM 30 is designed to extract signals transmitted on the 1550 nanometer wavelength, the OADM may in fact extract any signal within an approximately 12 nanometer bandwidth centered about the 1550 nanometer wavelength. As such, any wavelength between 1544 and 1556 nm is extracted by the OADM 30. In the present example, an individual signal 34 is extracted from the multiplexed transmission 14 and output to a device existing on the network, such as a network node 36, through the west drop port 38.

All other wavelengths remaining on the multiplexed transmission continue through the OADM 30 and exit through an east output port 40, where they may continue to propagate on the fiber-optic network. If the OADM is a bidirectional module, such as OADM 30, a multiplexed transmission traveling in a westerly direction enters the OADM 30 at the east input port 48, drops the particular signal through the east drop port 47, adds a signal through the west add port 44, and propagates the remaining wavelengths through the west output port 49.

The network node 36 has two transceiver modules 42. In one embodiment, the transceiver modules may be GigaBit Interface Components (GBICs). The transceiver modules 42 have an input port for accepting optical signals so that the signals can be converted to a data signal useful by the network node 36, and output ports for generating optical signals from the network node 36 so that data from the network node 36 may be propagated on the fiber-optic network. Optical signals from the network node 36 may be propagated onto the fiber-optic network such that they travel in a westerly direction by inputting the signals into the west add port 44 or propagated to the fiber-optic network, such that they travel in an easterly direction by inputting the signal signals into the east add port 45. By using an OADM that is bidirectional, redundancy may be added to the optical fiber network to provide for such contingencies as broken fibers in one of the directions. Optical add/drop multiplexers, such as OADM 30, are generally passive devices and are constructed using thin-film three-port devices, fused fiber devices, or other passive components.

WDM systems with dual fibers typically use unidirectional signal transmission on each fiber to accommodate the traffic in each direction. Such dual line systems can provide an advantage in providing systems with a system redundancy. For example, FIGS. 4A and 4B depict a double line ring structure 50. The ring includes a multiplexer/demultiplexer ("mux/demux") module 52, a series of optical add/drop multiplexers ("OADMs") 54, 56, 58, 60, and double lines, or fibers, 62, 64. In the event that the double lines 62, 64 are broken, as depicted at break 66 in FIG. 4B, each of OADMs 58 and 60 can take the signal traveling a first direction down one fiber and redirect the signal down the parallel fiber in the opposite direction, as depicted by arrows 68, 70. This process is depicted in greater detail in FIG. 5, where it seen that, by way of example, a 1470 wavelength signal can be added or dropped from a first line 62 and added or dropped to a second line 64 so that the transmission in the loop is maintained.

In addition, in dual line systems, should one fiber become broken, the other fiber can provide a redundancy that can be used to restore or redirect data transmission as desired.

The main disadvantage in dual line systems is the cost in creating, maintaining, and purchasing or leasing a dual line system. For example, businesses having multiple campuses often rent lines for communication across external networks. The cost of renting the lines is set in part by the number of fibers and the length over which they travel. By way of example, a forty kilometer dual line fiber rental at one hundred dollars per month per kilometer would cost eight thousand dollars per month.

Accordingly, there is a continuing need for improved and less expensive methods and devices for decreasing the cost of data transmission without sacrificing system safeguards.

BRIEF SUMMARY OF THE INVENTION

The present invention provides bi-directional (BiDi) systems and methods to send signals both upstream and downstream on a single fiber. More particularly, the present invention uses specialized optical add/drop multiplexers (OADMs) to enable BiDi data transmission in WDM systems over a single fiber. In addition, nodes in a WDM ring system can be provided with paired wavelength channels so that the nodes can interchange data exclusive of other nodes in the system.

Other embodiments of the invention relate to devices for providing redundancy protection in single line BiDi line ring structures. Whereas double line ring structures overcome a break in the lines by using an OADM to route the signal back in a loop over the same fiber, single fiber loops do not have this option. Accordingly, the devices of the present invention overcome this by using an OADM module to receive a signal on a first wavelength from a first direction, shift the signal from the first wavelength to a second wavelength, and send the signal back down the fiber it originated from on the second wavelength.

Accordingly, a first example embodiment of the invention is a single-fiber optical add/drop multiplexer module that is used for accessing and transmitting optical signals on a single optical fiber in a wavelength division multiplexing architecture. The OADM module includes a first port for relaying and receiving optical signals to and from a first optical fiber; a second port for relaying and receiving optical signals to and from a second optical fiber; a third port in communication with each of the first port and a first optical transceiver, the third port configured for receiving a first optical signal from the first port and relaying the first optical signal to the first optical transceiver and receiving a second optical signal from the first optical transceiver and relaying the second optical signal to the first port; and a fourth port in communication with each of the second port and a second optical transceiver, the fourth port configured for receiving a second optical signal from the second port and relaying the second optical signal to the second optical transceiver and receiving a second optical signal from the second optical transceiver and relaying the second optical signal to the second port.

Another example embodiment of the invention is an optical network for communicating data between nodes in a wavelength division multiplexing architecture. The optical network includes a first optical add/drop multiplexer at a first node in the optical network for accessing and sending optical signals bi-directionally on a single optical fiber; and a second optical add/drop multiplexer at a second node in the optical network for accessing and sending optical signals bi-directionally on a single optical fiber. Each of the first optical add/drop multiplexer and the second optical add/drop multiplexer are capable of receiving and transmitting optical signals over a first wavelength channel and a second wavelength channel.

Yet another example embodiment of the invention is a method for providing redundancy in data transmission over a single fiber in a bi-directional-line ring architecture. The method includes, at an optical add/drop multiplexer in a bi-directional line ring structure: receiving an optical signal over a first wavelength channel from a first direction down a first optical fiber; converting the optical signal from the first wavelength channel to a second wavelength channel; and redirecting the optical signal down the first optical fiber in a second direction.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to the use of systems and methods to send signals both upstream and downstream on a single fiber. More particularly, the present invention uses specialized optical add/drop multiplexers (OADMs) to enable bi-directional data transmission in WDM systems over a single fiber.

Other embodiments of the invention relate to devices for providing redundancy protection in single line BiDi line ring structures. Whereas double line ring structures can overcome a break in the lines by using an optical add/drop multiplexer ("OADM") to route the signal back in a loop over the same fiber, single fiber loops do not have this option. Accordingly, the devices of the present invention overcome this by using an OADM module to receive a signal on a first wavelength from a first direction, shift the signal from the first wavelength to a second wavelength, and send the signal back down the fiber it originated from on the second wavelength.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical networks have not been described in particular detail in order to avoid unnecessarily obscuring the present invention.

Figure 6:
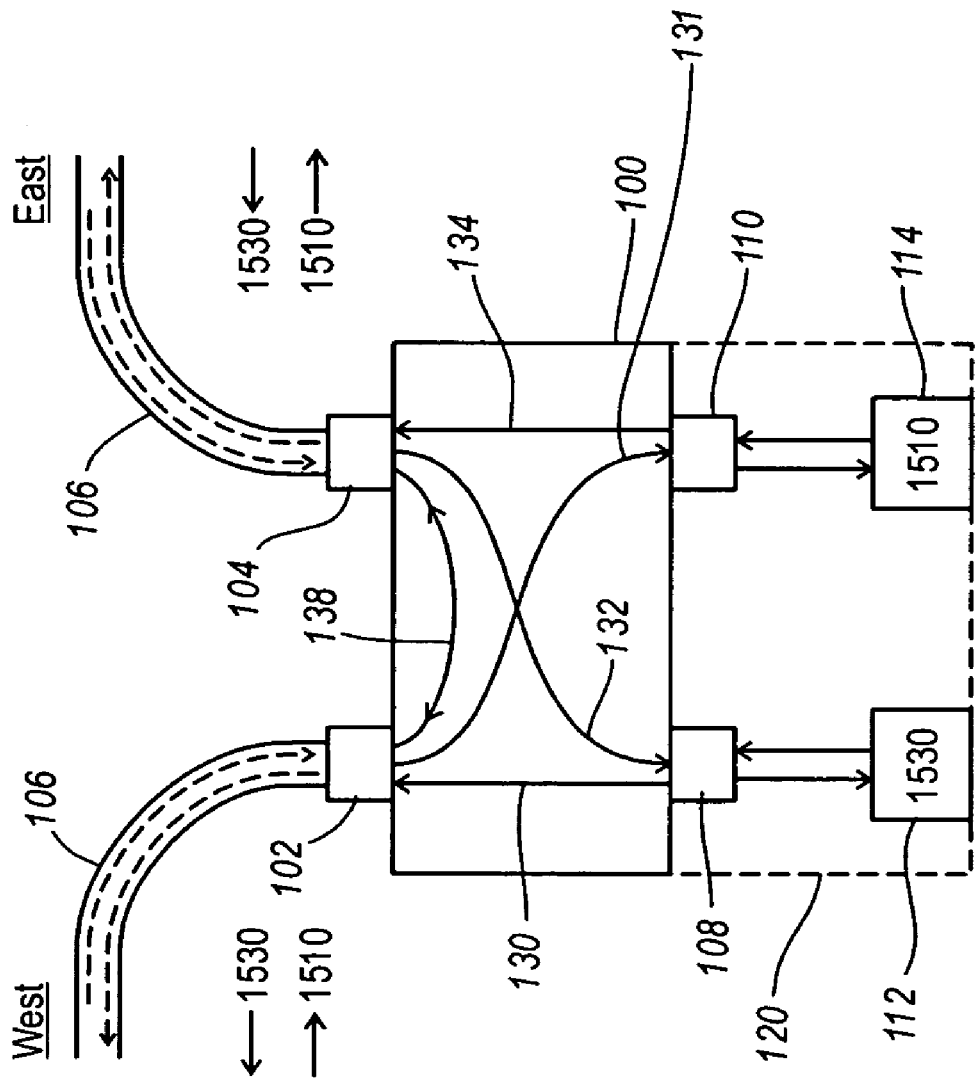
FIG. 6 is a block diagram depicting the operation of an optical add/drop multiplexer according to embodiments of the invention.

Referring now to FIG. 6, an exemplary 1510/1530 wavelength OADM 100 is depicted in block form. OADM 100 is a four port device. OADM 100 has a port located at each connection point to the main line 106. Each such port 102, 104 is configured for receiving and propagating a multiplexed signal in each of the West and East directions, as depicted in FIG. 6. In addition, OADM 100 has two transceiver ports 108, 110 for connecting optical transceivers 112, 114 with the main line 106. The optical transceivers are used for receiving data over selected bandwidths from the main line and adding data to the main line over selected bandwidths. Thus, the OADM 100 enables individual devices to connect to the line and access a single channel from the multiplexed signal on the line. More particularly, OADM 100 allows individual devices to access either the 1510 or 1530 nm wavelength channels.

In the depicted embodiment, each transceiver 112, 114 is a device that receives and sends optical signals over the same wavelength. Thus, transceiver 112 receives and sends optical signals centered at the 1530 nm wavelength channel and transceiver 114 receives and sends optical signals centered at the 1510 nm wavelength channel. The transceivers 112, 114 may be combined with OADM 100 in a single device, as indicated by dotted line 120, but are more preferable maintained as separate devices connected by optical fibers or other interconnecting devices.

Generally, OADMs (with the accompanying transceivers) are used at nodes, or connection points, to manage exchanges of data channel signals in an optical network. Particularly, an add/drop module may drop an unused channel of a multiplexed signal while simultaneously adding a different, appropriate channel. OADMs may interface directly with a computer to communicate Ethernet data from a fiber-optic network, in which case the OADMs are used to extract the channel of interest from the multiplexed optical signal. OADMs also may be employed in transceivers or some other nodes in a fiber optic network.

More specifically, OADMs extract from the multiplexed signal those channels that are to be used by a device in the network. This enables components on a network, such as two computers, to communicate over the same wavelength, or channel, of a fiber optic signal, without necessarily interrupting bandwidth dedicated to the other channels in the signal. For similar reasons, the add/drop module also can be used to insert the dropped channel back into the optical signal, or to include different data that is encoded on the same wavelength as the dropped channel. An OADM may employ an optical filter (not depicted in FIG. 6), such as a bandpass filter, to extract or insert the desired optical signals over selected bandwidths.

Figure 1:
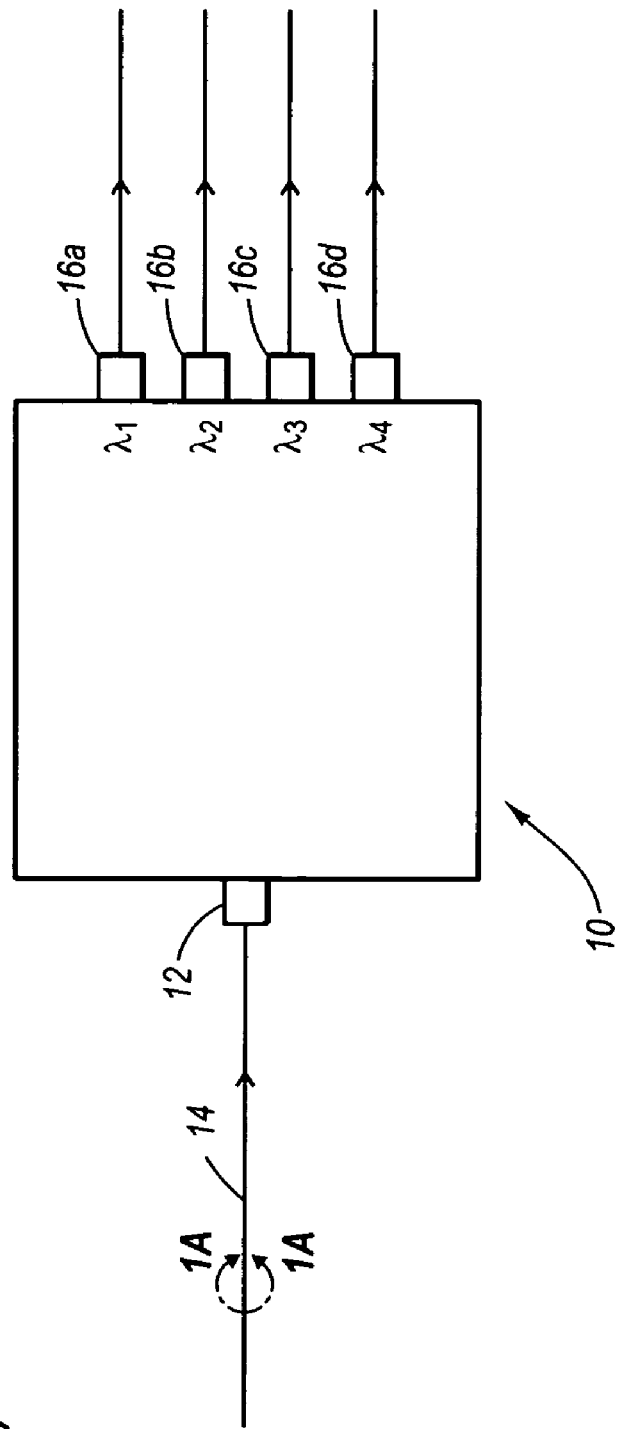
FIG. 1 illustrates an exemplary optical demultiplexer for use in wavelength division multiplexing fiber optic networks.
Figure 1A:
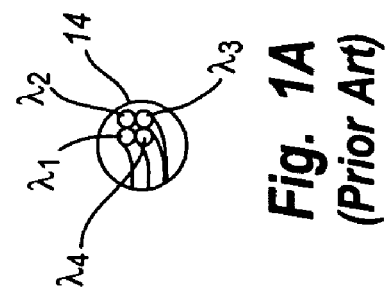
FIG. 1A illustrates multiplexed signal transmission over an optical fiber according to the system depicted in FIG. 1.
Figure 2:
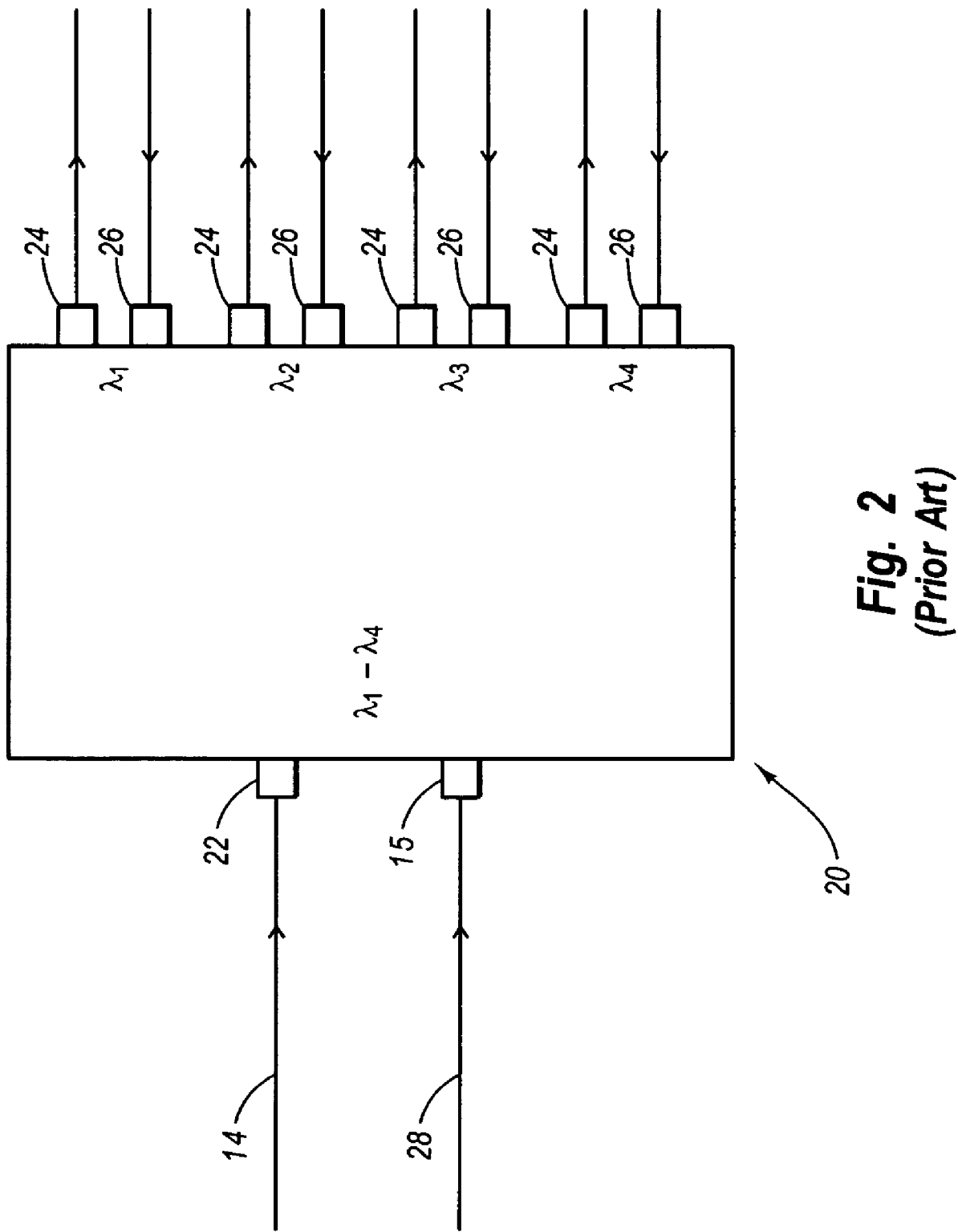
FIG. 2 illustrates a mux/demux for use in wavelength division multiplexing fiber optic networks.
Figure 3:
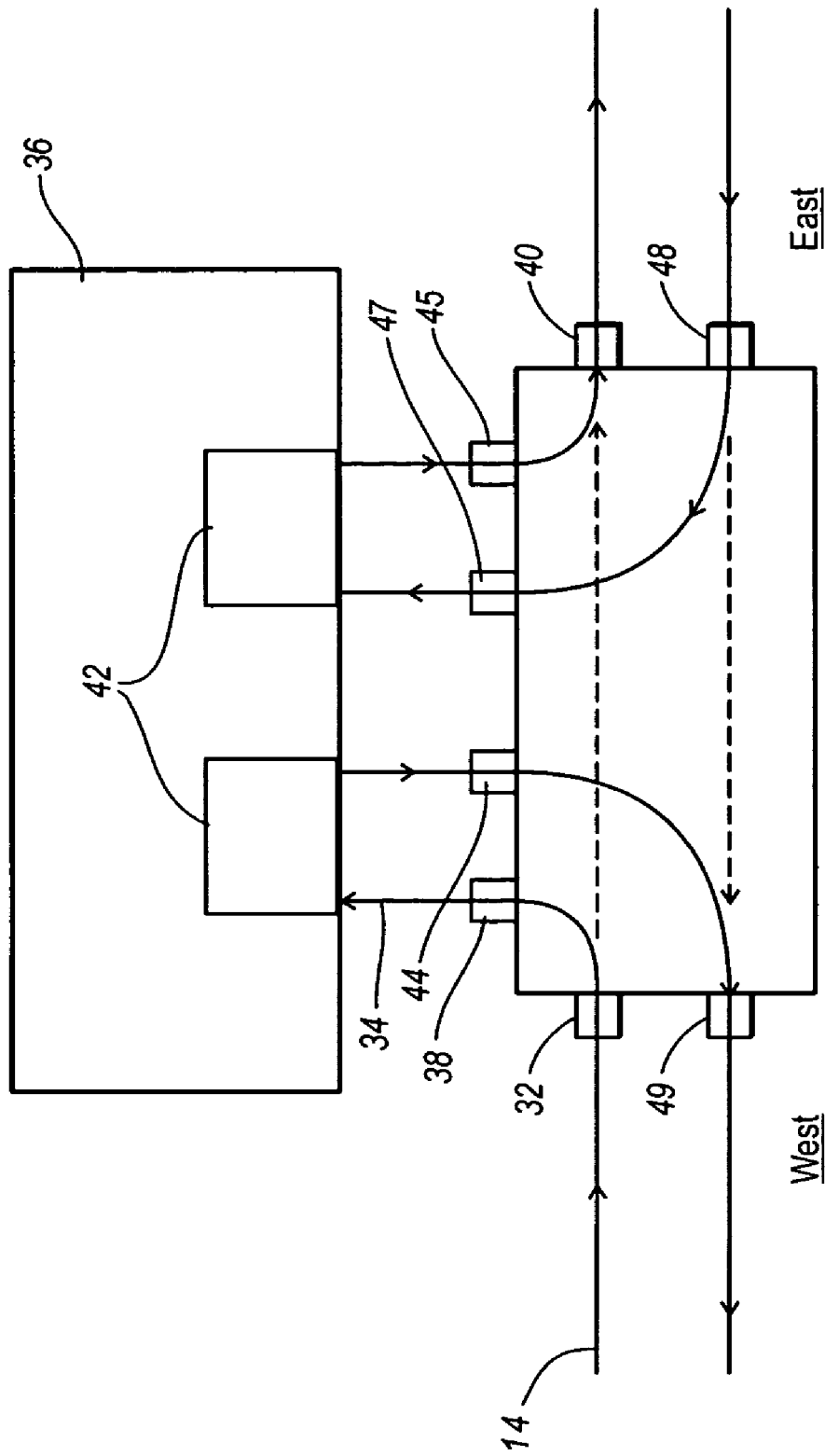
FIG. 3 illustrates an exemplary OADM for use in wavelength division multiplexing fiber optic networks.

A comparison between the OADM 30 in FIG. 3 and OADM 100 in FIG. 6 readily illustrates a key feature of OADM 100 according to the invention. Whereas OADM 30 receives and sends signals over dual main lines, OADM 100 sends and receives signals over a single main line 106. Thus, OADM 100 doubles the signal capacity over a single line by helping coordinate the bidirectional traffic over line 106.

More particularly, in the depicted embodiment OADM 100 routes an optical signal over the 1510 nm wavelength channel received from the West direction to transceiver 114, as indicated by arrow 131. Thus, this optical signal is dropped from the multiplexed signal. In turn, another optical signal over the 1510 nm wavelength channel is generated by transceiver 114 and is routed to port 104 for transmission in the East Direction, as indicated by arrow 134. This is new signal is thereby added to the multiplexed signal. Similarly, OADM 100 routes an optical signal over the 1530 nm wavelength channel received from the East direction to transceiver 112, as indicated by arrow 132, and is thereby dropped from the multiplexed signal. An optical signal generated by transceiver 114 over the 1530 nm wavelength channel is in turn routed to port 102 for transmission in the West Direction, as indicated by arrow 130, and is thereby added to the multiplexed signal. Traffic that is not on either the 1510 nm or 1530 nm channels passes freely through OADM 100 in both directions, as indicated by line 138.

Each of the optical signals within OADM 100 may be routed by way of any combination of one or more of: mirrors, reflective surfaces, bandpass filters, optical fibers, thin-film three-port devices, birefringent crystals, and any other optical device that can be used to route, separate, and/or combine optical signals over distinct wavelength channels.

Figure 7:
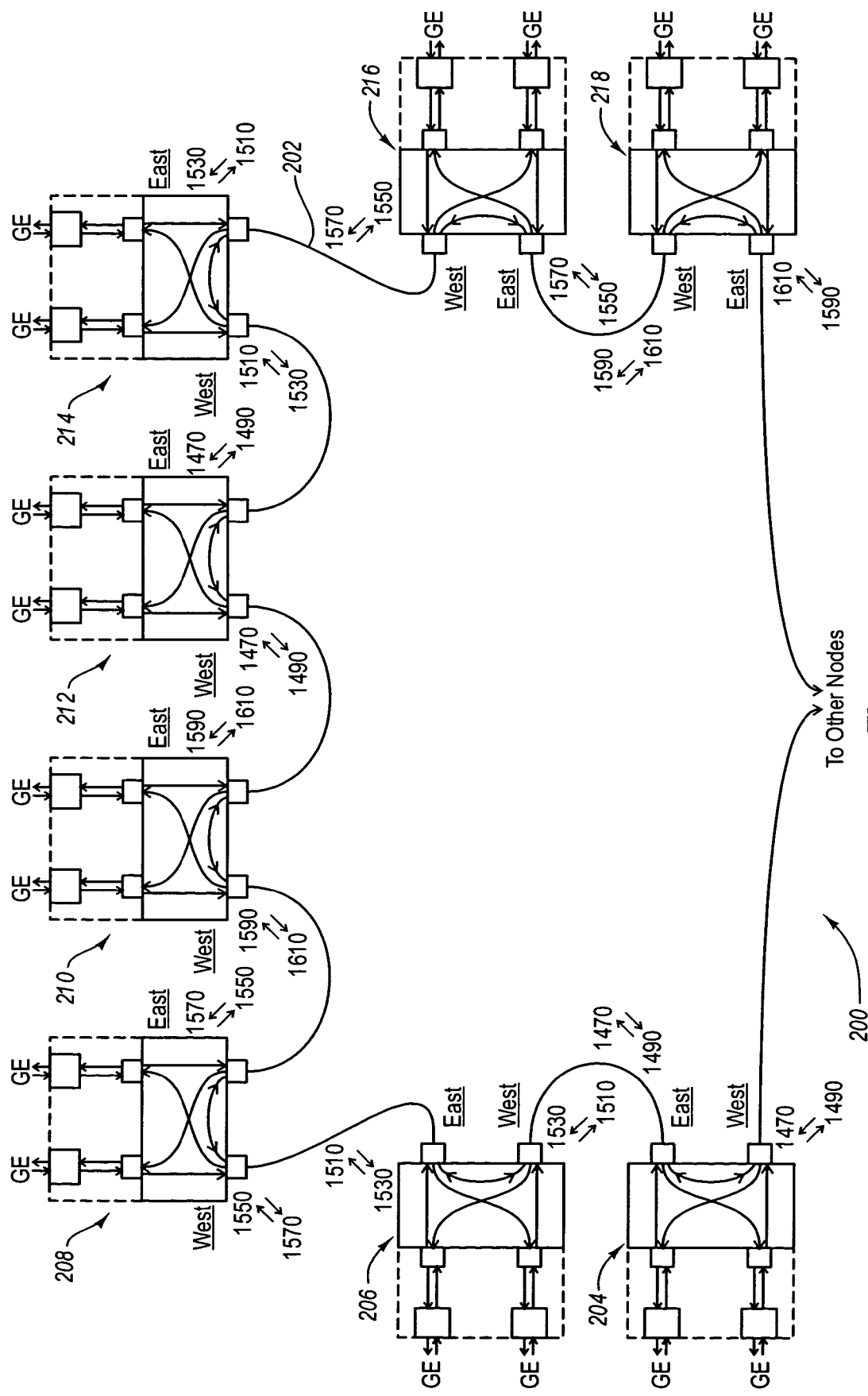
FIG. 7 depicts details of fiber optic bi-directional systems and methods implementing optical add/drop multiplexers according to embodiments of the invention.

Referring now to FIG. 7, an optical network configured as a single fiber add/drop ring 200 with protection is depicted. In the ring 200, a series of single fiber segments 202 connect eight nodes 204, 206, 208, 210, 212, 214, 216, 218. At each of the nodes an OADM is situated to access and send signals over a selected pair of wavelengths. By way of non-limiting example, nodes 204 and 212 each have 1470/1490 OADMs, nodes 206 and 214 have 1510/1530 OADMs, nodes 208 and 216 have 1550/1570 OADMs, and nodes 210 and 218 have 1590/1610 OADMs. In the depicted embodiment of FIG. 7, selected wavelengths (1470, 1510, 1550, and 1590) travel in a first direction on fiber 202 while other wavelengths (1490, 1530, 1570, 1610) travel in the opposite direction on fiber 202.

In one implementation of the invention, each of the nodes in FIG. 7 may be implemented at one of various locations in an area network, such as a metropolitan area network (MAN). For example, each node may located at an office building or a university campus building. Because not every channel in the ring may be needed at a given time, and components on an optical network may need to communicate with each other through only one channel of a multiplexed optical signal, the OADMs at each node enable individual devices to connect to the ring and access a single channel from the multiplexed signal on the ring. Because this communication is occurring over a single fiber in FIG. 7 as opposed to the dual fiber system in FIG. 4, fewer resources are required for the network. In network environments where the cost of a network is tied to the number of fibers used (such as wherein a user rents fibers form a provider), this reduction in needed capacity can represent a significant cost savings.

Figure 4B:
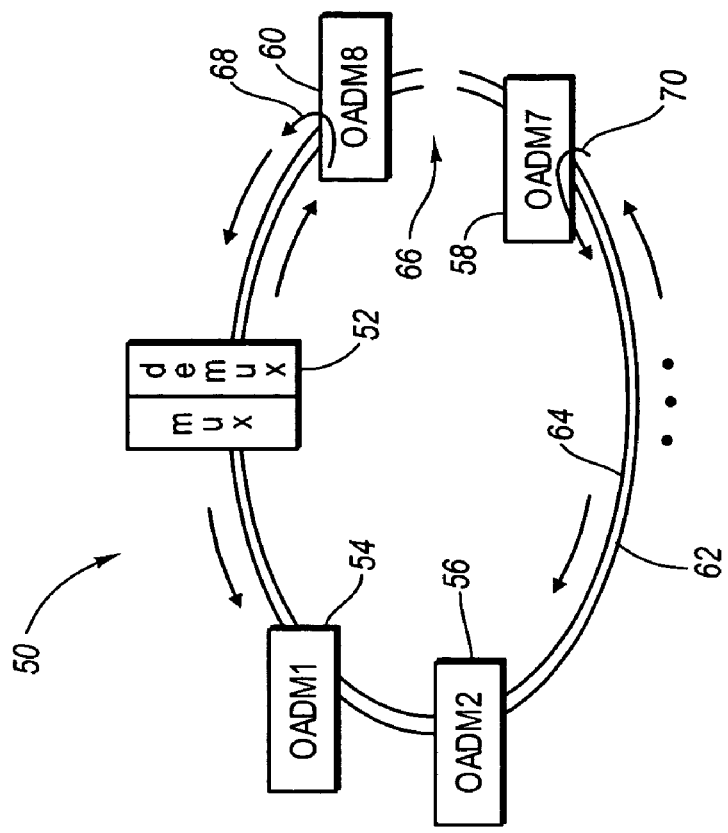
FIG. 4B illustrates the operation of a prior art double line ring structure providing system redundancy.
Figure 4A:
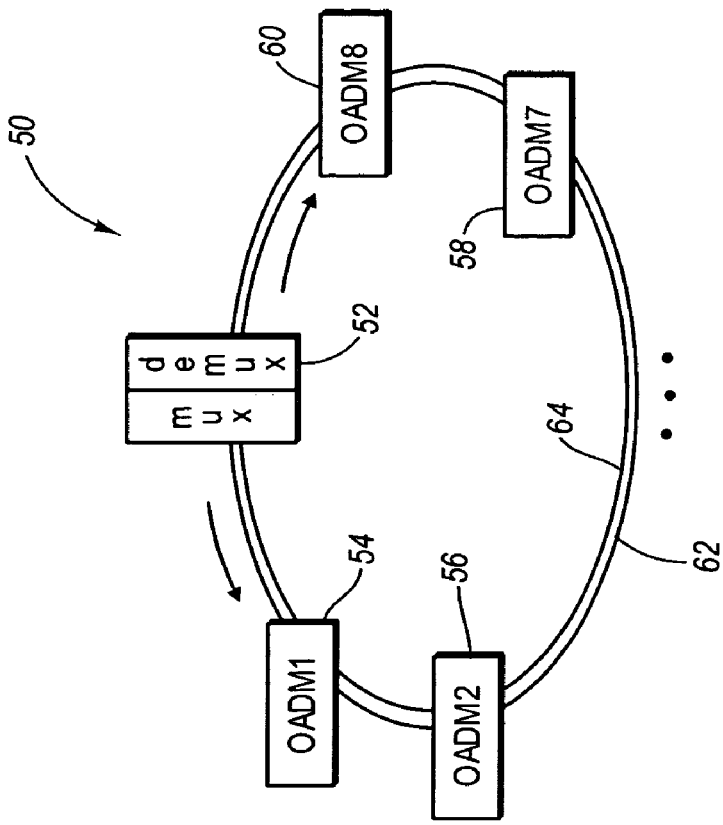
FIG. 4A illustrates an exemplary double line ring structure providing system redundancy.
Figure 5:
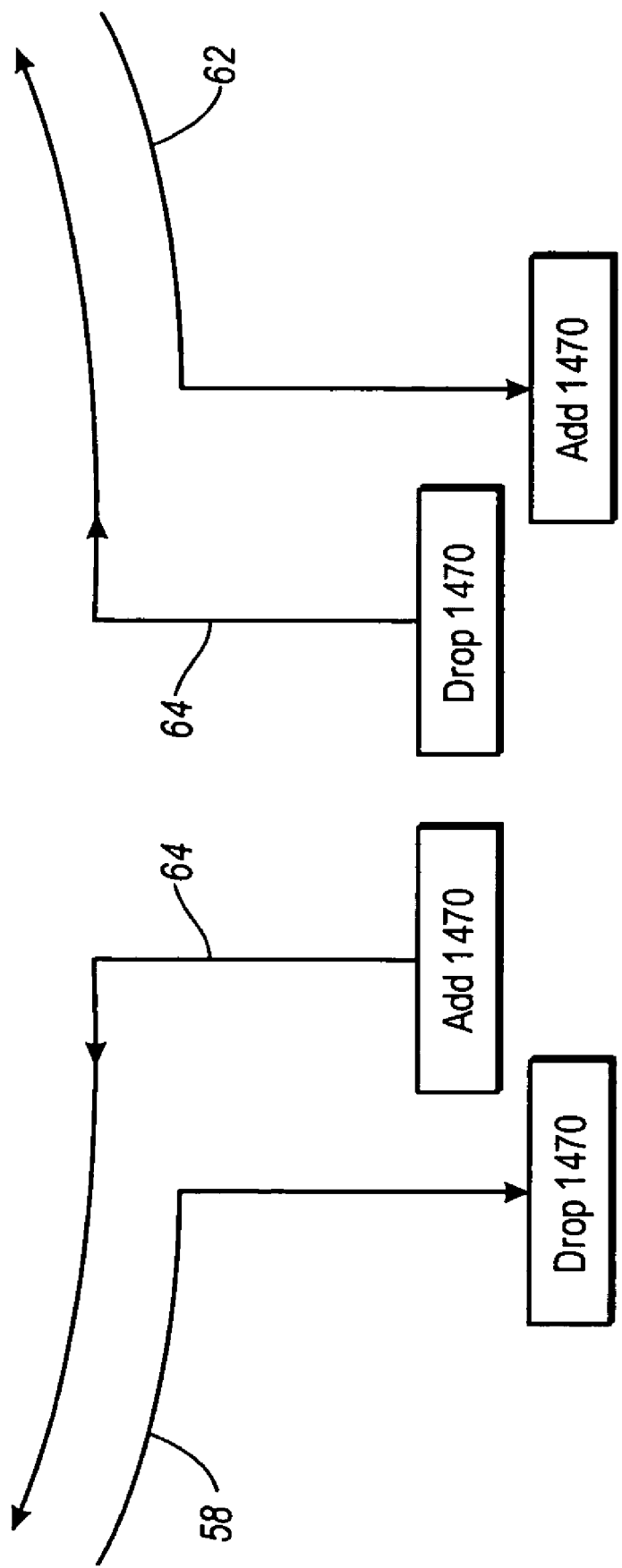
FIG. 5 illustrates the operation of the prior art double line ring structure providing system redundancy of FIG. 4.
Figure 8B:
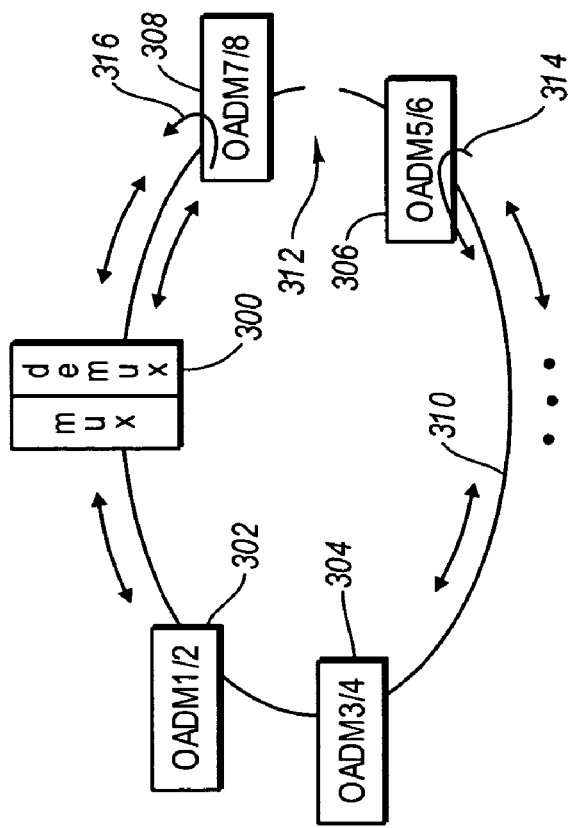
FIG. 8B depicts the use of the fiber optic bi-directional systems and methods of FIG. 8A according to other embodiments of the invention.
Figure 8A:
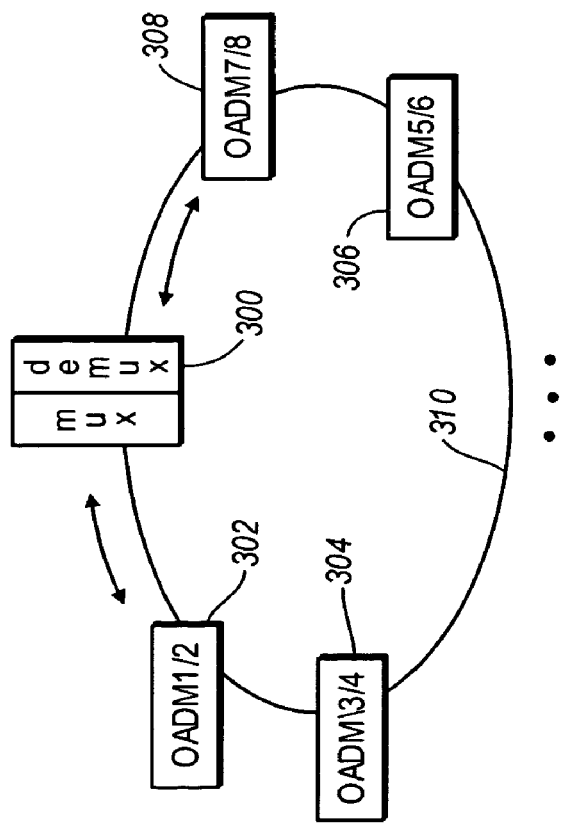
FIG. 8A depicts details of fiber optic bi-directional systems and methods according to other embodiments of the invention.
Figure 9:
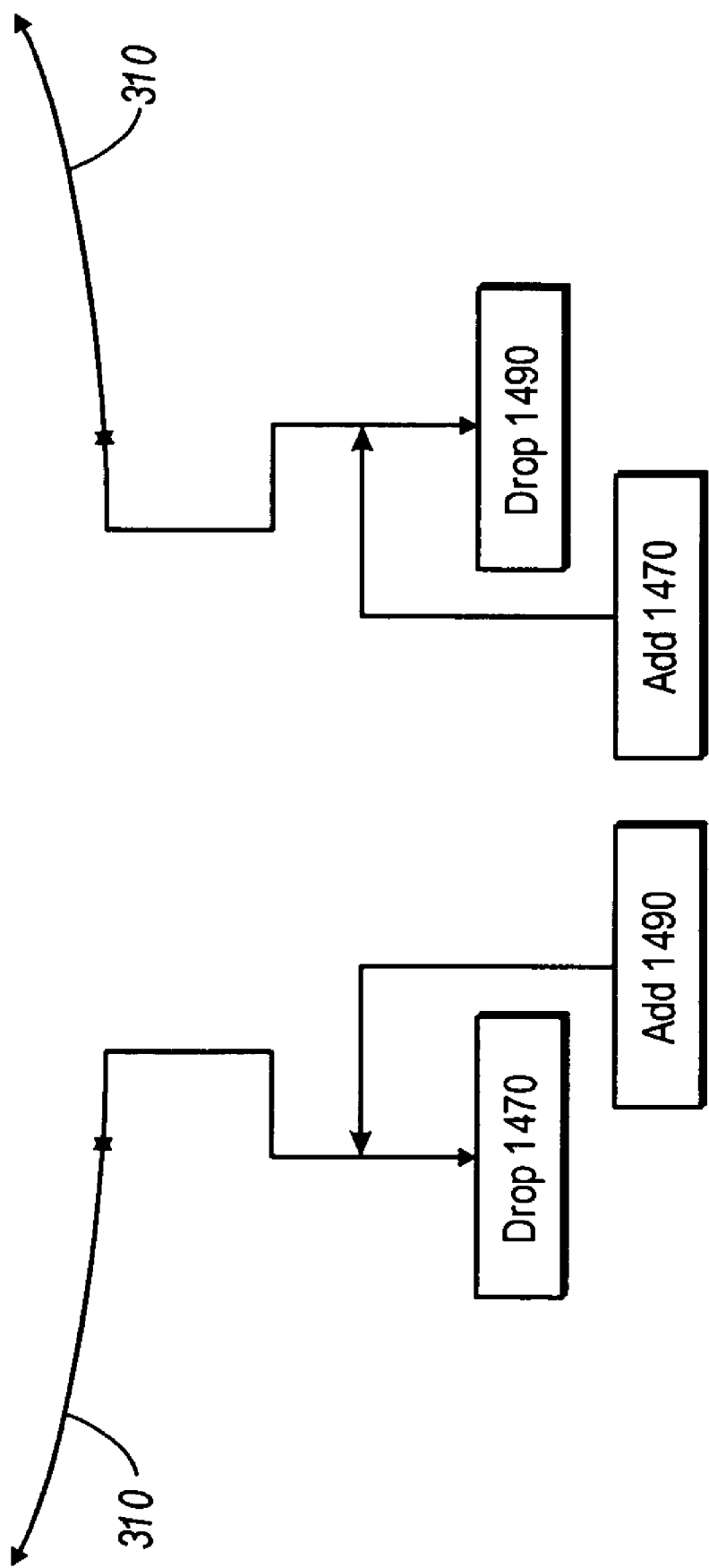
FIG. 9 is a block diagram depicting the operation of fiber optic bi-directional systems and methods according to embodiments of the invention.

Referring now to FIGS. 8A, 8B, and 9, the system redundancy provided by the unidirectional dual fiber systems of FIGS. 4A, 4B, and 5 can be obtained in single fiber BiDi systems according to the invention in a single fiber system. The depicted BiDi ring structure includes multiplexer/demultiplexer ("mux/demux") 300, optical add/drop multiplexers ("OADMs") 302, 304, 306, and 308, and single optical fiber 310. Traffic passes both directions around the ring on the single optical fiber 310.

Because not every channel in the ring may be needed at a given time, and components on an optical network may need to communicate with each other through only one channel of a multiplexed optical signal, the OADMs 302, 304, 306, and 308 enable individual devices to connect to the ring and access a single channel from the multiplexed signal on the ring.

In the event that the single fiber 310 is broken, as depicted at break 312 in FIG. 8B, each of OADMs 306 and 308 can take the signal traveling a first direction down one fiber and redirect the signal back down the same fiber in the opposite direction, as depicted by arrows 314, 316. This process is depicted in greater detail in FIG. 9, where it seen that, by way of example, a 1470 wavelength signal can be dropped from the single fiber 310 and converted to a 1490 wavelength signal and added back to the single fiber 310 in the opposite direction so that the transmission in the loop is maintained. Other wavelengths can be similarly added or dropped, such as the depicted dropping of a 1490 wavelength signal and the addition of a 1470 wavelength signal.

The conversion of a signal from a first wavelength channel to a second wavelength channel may be performed by any of various methods known in the art for this function. In one embodiment, for example, an optical signal is received in a first transceiver and converted to an electrical signal by a photodiode receiver. The electrical signal is communicated to a second transceiver, which in turn transmits the signal via a laser as an optical signal over a second wavelength channel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A single-fiber optical add/drop multiplexer for accessing and transmitting optical signals on a single optical fiber in a wavelength division multiplexing architecture, comprising:

a first port configured to relay and receive optical signals to and from a first portion of the single optical fiber;

a second port configured to relay and receive optical signals to and from a second portion of the single optical fiber;

a third port in communication with each of the first port, the second port, and a first optical transceiver; and a fourth port in communication with each of the first port, the second port, and a second optical transceiver, wherein the first port is configured to communicate substantially simultaneously with the third and fourth ports, and the second port is configured to communicate substantially simultaneously with the third and fourth ports wherein the first optical transceiver transmits and receives optical signals over a first wavelength channel and the second optical transceiver transmits and receives optical signals over a second wavelength channel that is different from the first wavelength channel.

2. An optical add/drop multiplexer as defined in claim 1, wherein the third port is configured to receive a first optical signal from the second port, relay the first optical signal to the first optical transceiver, receive a second optical signal from the first optical transceiver, and relay the second optical signal to the first port, and wherein the fourth port is configured to receive a third optical signal from the first port, relay the third optical signal to the second optical transceiver, receive a fourth optical signal from the second optical transceiver, and relay the fourth optical signal to the second port.

3. An optical add/drop multiplexer as defined in claim 2, wherein the first optical signal and the second optical signal are over a first wavelength channel and the third optical signal and the fourth optical signal are over a second wavelength channel.

4. An optical add/drop multiplexer as defined in claim 3, wherein the first wavelength channel and the second wavelength channel comprise CWDM channels.

5. An optical add/drop multiplexer as defined in claim 3, wherein optical signals that are not over the first wavelength channel or the second wavelength channel are relayed between the first port and the second port without being communicated to the third port or the fourth port.

6. An optical add/drop multiplexer as defined in claim 2, wherein the first, second, third, and fourth optical signals are communicated between the first port, the second port, the third port, and the fourth port by way of one or more of a bandpass filter, a mirror, an optical fiber, a thin-film three-port device, a birefringent crystal, and a reflective surface.

7. An optical add/drop multiplexer as defined in claim 1, further comprising a plurality of bandpass filters configured to selectively route the optical signals over selected wavelength channels to designated ports.

8. An optical network for communicating data between nodes in a wavelength division multiplexing architecture, comprising:
   a first optical add/drop multiplexer at a first node in an optical network, the first optical add/drop multiplexer configured to access and send optical signals bi-directionally on a single optical fiber; and
   a second optical add/drop multiplexer at a second node in the optical network configured to access and send optical signals bi-directionally on the single optical fiber;
   wherein each of the first optical add/drop multiplexer and the second optical add/drop multiplexer comprises:
      a first optical transceiver and a first port optically coupled together, the first optical transceiver being configured to receive and transmit optical signals over a first wavelength channel through the first port; and
      a second optical transceiver and a second port optically coupled together, the second optical transceiver being configured to receive and transmit optical signals over a second wavelength channel through the second port.

9. An optical network as defined in claim 8, wherein the first wavelength channel and the second wavelength channel comprise CWDM channels.

10. An optical network as defined in claim 8, wherein the first optical add/drop multiplexer comprises:
   a third port configured to relay and receive optical signals to and from a first portion of the single optical fiber; and
   a fourth port configured to relay and receive optical signals to and from a second portion of the single optical fiber,
   wherein the first port is in communication with each of the third port, the fourth port, and the first optical transceiver, the first port configured to receive a first optical signal from the fourth port, relay the first optical signal to the first optical transceiver, receive a second optical signal from the first optical transceiver, and relay the second optical signal to the third port, and
   wherein the second port is in communication with each of the third port, the fourth port, and the second optical transceiver, the second port configured to receive a third optical signal from the third port, relay the third optical signal to the second optical transceiver, receive a fourth optical signal from the second optical transceiver, and relay the fourth optical signal to the fourth port.

11. An optical network as defined in claim 10, wherein the first, second, third, and fourth optical signals are communicated between the first port, the second port, the third port, and the fourth port by way of one or of a bandpass filter, a mirror, an optical fiber, a thin-film three-port device, a birefringent crystal, and a reflective surface.

12. An optical network as defined in claim 8, wherein the first optical add/drop multiplexer further comprises a plurality of bandpass filters that are used to selectively route the optical signals over selected wavelength channels to designated ports.

* * * * *